United States Patent
Sauerland et al.

[11] Patent Number: 6,138,484
[45] Date of Patent: Oct. 31, 2000

[54] ROD LOCKING DEVICE DESIGNED FOR SNAP-FITTING

[75] Inventors: Manfred Sauerland, Essen; Friedhelm Runge, Wuppertal, both of Germany

[73] Assignee: EMKA Beschlagteile GmbH & Co. KG, Germany

[21] Appl. No.: 09/171,626

[22] PCT Filed: Apr. 8, 1997

[86] PCT No.: PCT/DE97/00727

§ 371 Date: Apr. 8, 1999

§ 102(e) Date: Apr. 8, 1999

[87] PCT Pub. No.: WO97/40247

PCT Pub. Date: Oct. 30, 1997

[30] Foreign Application Priority Data

Apr. 19, 1996 [DE] Germany ............. 296 06 992 U

[51] Int. Cl.$^7$ .................................................. E05B 65/44
[52] U.S. Cl. ................................. 70/78; 70/208; 70/451
[58] Field of Search ................................ 70/78–84, 448, 70/451, 466, 208, 370, 371, 367; 292/DIG. 53

[56] References Cited

U.S. PATENT DOCUMENTS

| | | | |
|---|---|---|---|
| 4,534,487 | 8/1985 | Rapata ................................... | 70/451 X |
| 4,683,736 | 8/1987 | Weinerman et al. .................... | 70/81 X |
| 5,722,269 | 3/1998 | Simon et al. .............................. | 70/208 |
| 5,893,282 | 4/1999 | Runge et al. .............................. | 70/208 |
| 5,934,115 | 8/1999 | Bernier et al. ............................. | 70/208 |
| 5,970,757 | 10/1999 | Ramsauer ................................. | 70/208 |

FOREIGN PATENT DOCUMENTS

| | | |
|---|---|---|
| 0 157 159 | 10/1985 | European Pat. Off. . |
| 0 649 955 A1 | 4/1995 | European Pat. Off. . |
| 2 700 356 | 7/1994 | France . |
| 26 54 591 | 6/1978 | Germany . |
| 28 03 805 | 8/1979 | Germany . |
| 2 077 344 | 12/1981 | United Kingdom . |

*Primary Examiner*—Suzanne Dino Barrett
*Attorney, Agent, or Firm*—Robert W. Becker & Associates

[57] ABSTRACT

A rod locking device for locking cabinet doors has locking rods movable between an unlocked position for unlocking the cabinet doors and a locking position for locking the cabinet doors. A two-part lock housing having short rods arranged therein is provided. The short rods are connected by a connecting device to the locking rods. The lock housing has a drive member arranged therein and connected to the short rods. An actuating device is connected to the drive member for actuating the drive member in order to move the short rods. The short rods have a length such that, in a retracted position, the short rods do not project from the lock housing. The lock housing has a base plate to be positioned at the exterior side of the cabinet door at a door penetration. The lock housing has a first lock housing part and a second lock housing part, wherein the second lock housing part is congruent to the first lock housing part in a view perpendicular to the base plate such that the lock housing is insertable into the door penetration from the exterior side of the cabinet door. The first lock housing part is in the form of a projection that is a unitary part of the base plate. The lock housing, when preassembled from the first and second lock housing parts and having the short rods arranged therein in their retracted position, is insertable through the door penetration of the cabinet door from the exterior side. The first lock housing part has laterally arranged spring tongues and the base plate is snapped into place at the door penetration by spring tongues.

7 Claims, 2 Drawing Sheets

ROD LOCKING DEVICE DESIGNED FOR SNAP-FITTING

BACKGROUND OF THE INVENTION

The invention relates to a rod locking device for locking cabinet doors, especially of thin-walled switch cabinets, comprising an arrangement of locking rods which are movable in the interior of the cabinet between an opening position and a closing position and which have locking means that cooperate with closure holders fastened within the body of the cabinet. For driving the locking rod arrangement, a two-part lock housing, receiving the locking rods in a guiding manner and supporting a pinion therein, is provided wherein the pinion can be rotated by an actuating device seated within the base plate located at the exterior side of the cabinet door. A first part of the lock housing is formed by a projection of the base plate formed as a unitary part thereof and insertable through a door penetration.

Such a rod locking device is known from European Patent Application 0 261 266 B1. In a first embodiment of the known locking rod device (FIG. 14) comprising a pivot lever as an actuating device, the base plate is provided with a projection that can be inserted through the corresponding door penetration and has a receiving opening in which the folded position the pivot lever is received. The projection forms the first part of the lock housing with guide walls for guiding the flat strip rod and a bearing for the pinion. A second part of the lock housing can be placed in an overlapping fashion onto the projection that defines the first part of the lock housing such that the edges of the second lock housing part facing the door panel in the mounted state of the rod locking device rest at the inner surface of the door panel. For fastening the base plate as well as the lock housing, the second lock housing part is connected by screws penetrating into the first lock housing part, respectively, into the base plate, such that the base plate and the second lock housing part, with the door panel interposed, are pressed against one another, and the rod locking device is thus secured in the door penetration.

The known rod locking device has the disadvantage of a complicated assembly because, after placement of the base plate onto the exterior side of the door and insertion of the projection provided at the base plate into the door penetration, the assembly of the pinion and of the rods must take place at the backside of the door while simultaneously placing the second lock housing part thereon, whereby the pinion and the rods in the pre-mounted position must be secured until the second lock housing part is connected by the screws to the first lock housing part, respectively, the base plate.

The printed document mentioned above discloses furthermore a second embodiment in which the two-part lock housing as a whole in a pre-mounted state can be placed onto the projection, provided at the base plate and penetrating the door penetration, and can be screwed to this base plate so that the door panel is clamped between the base plate and the lock housing. The assembly is in this situation also complicated because the lock housing must be placed from behind onto the projection of the base plate whereby the base plate during assembly must be secured or held at the door panel, respectively, within the door penetration. Furthermore, in both embodiments of the known rod locking device, a plurality of screws and a plurality of tools must be provided and used for mounting the rod locking device at the door panel.

It is therefore an object of the invention to provide a rod locking device of the aforementioned kind that can be mounted at the cabinet door without special fastening means and tool use.

SUMMARY OF THE INVENTION

The invention is based on the principle that the second part of the lock housing can be embodied congruent to the first part of the lock housing so that the lock housing in the premounted state can be pushed through the door penetration, whereby the rod arrangement is comprised of two short rods guided within the lock housing and comprising a connecting device for attachment to exterior locking rods. The short rods in their position pushed into the lock housing can be guided together with the lock housing through the door penetration, and the base plate can be snap-fit into position within the door penetration by spring tongues positioned laterally at the first lock housing part. The advantage of the invention is that the assembly of the pre-mounted rod locking device can be performed without use of further fastening means and tools. It is only required to push the base plate with the lock housing, in which the short rods are premounted for attachment to the locking rods, are pushed through the door penetration and snapped into place by pressure onto the base plate, whereby the spring tongues provided at the lock housing will hook behind the door panel. The final assembly then only requires the attachment of the locking rods to the short rods.

According to one embodiment of the invention, the spring tongues are provided at the longitudinal sides of the first lock housing in the vicinity of the four corner points of the lock housing, whereby this embodiment ensures a corresponding stability of the snap-fit connection of the rod locking device.

According to one embodiment of the invention, it is suggested that a plurality of spring tongues are arranged with respectively different spacing of the snap-fit edge facing the base plate to the base plate for snap-fitting into the door penetrations of cabinet doors having different material thickness. This has the advantage that the rod locking device is designed for mounting at cabinet doors with different material thickness since, for example, conventional cabinet doors with 1.5 mm or 2 mm material thickness are available. When the snap-fit edges of the spring tongues have a spacing of 1.5 mm, respectively 2 mm to the outwardly positioned base plate, then the base plate can be snapped into place in such differently designed doors without auxiliary measures.

According to one embodiment of the invention, the second lock housing part is secured at the first lock housing part by a centrally arranged screw which engages the shaft of the actuating device whereby this attachment can be realized before pre-assembly of the rod locking device.

According to one embodiment of the invention, it is expedient when the second lock housing part is connected to the first lock housing part by a snap-fit connection of respectively matched form-locking members. In this connection of the second lock housing part to the first lock housing part, a securing of the shaft of the actuating device in the lock housing is required. However, this embodiment of the invention has the special advantage that an exchange of the actuating device after loosening of the shaft-securing screw can be performed without demounting the lock housing.

Inasmuch as in the aforementioned European Patent Application 0 261 266 B1 an embodiment of the known rod locking device for locking is designed for rectangular door penetrations, the second door penetration is provided, in the case of a rod locking device having an actuating device actuated by a pivot lever, for receiving and locking a cylinder lock provided at the pivot lever. Inasmuch as such a penetration design is provided at the switch cabinet door, according to one embodiment of the invention it is suggested that at the first door penetration a base plate with lock housing and short rods is snap-fit into place and that in the second door penetration a plate with an exterior cylinder lock can be snapped into place by correlated auxiliary spring tongues, whereby the lock lever in the closing position of the cylinder lock engages a cutout of the locking rod extending along the second door penetration and releases the locking rod in the open position of the cylinder lock. This has the advantage that an additional securing of the rod locking device is provided in case the actuating device is designed only for a socket wrench.

Inasmuch as a design with two door penetrations is provided and the additional securing locking action by a cylinder lock seems to be dispensable, the second door penetration can be covered by a blind plate seated in the door penetration and snap-fit into place by correlated securing spring tongues.

BRIEF DESCRIPTION OF THE DRAWINGS

The drawings show embodiments of the invention which will be disclosed in the following.

It is shown in.

DESCRIPTION OF PREFERRED EMBODIMENTS

Figure 1:
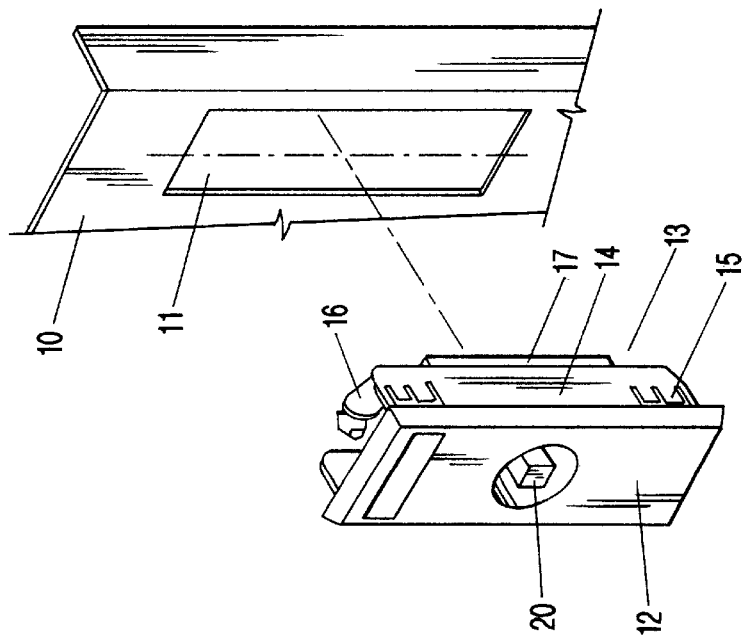
FIG. 1 an exploded view of a rod locking device for mounting in a door penetration.

As can be seen in FIG. 1, a cabinet door 10, represented only partially, has a door penetration 11 in which the rod locking device is to be mounted. The rod locking device has a base plate 12 at which a lock housing 13 to be inserted into the door penetration 11 is mounted, whereby a first part 14 of the lock housing 13 is a unitary part of the base plate 12. Spring tongues 15 are connected to this first part 14 of the lock housing 13 which, upon insertion of the lock housing 13 into the door penetration 11, will engage with their snap-fit edges facing the base plate 12 the panel of the door 10. The base plate 12 with the lock housing 13 is thus secured within the door penetration 11.

Figure 2:
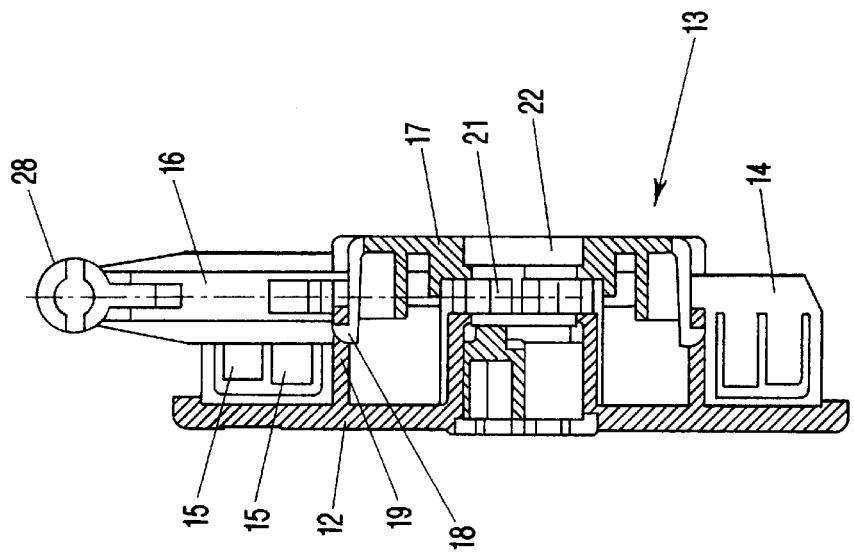
FIG. 2 the rod locking device according to FIG. 1 in a sectional side view.

As can be seen in FIG. 2, two different spring tongues 15 are respectively designed for different material thickness of door 10 whereby the snap-fit edges of the spring tongues have a spacing to the surface of the base plate 12 that depends on the door thickness and is, for example, 1.5 mm and 2 mm.

The lock housing 13 is completed by a second part 17 of the lock housing to be positioned onto the inner side of the door whereby this second lock housing part 17 can be locked by cutouts 19 provided at the first lock housing part 14 and by corresponding lock hooks 18 to the first lock housing part 14. The thus formed lock housing 13 has arranged therein movable short rods 16 that are driven by a drive member in the form of the pinion 21 positioned in the lock housing 13 whereby the short rods 16 at their outer ends have connecting devices 28 in the form of securing projections to which the locking rods 27 shown in FIG. 4 can be connected. The pinion 21 positioned within the lock housing 13 is rotatable by actuating device 20 whereby into the shaft of the actuating device 20 a screw 22 for securing the lock housing 13 can be inserted. The short rods 16 are dimensioned such that, as can be seen in FIG. 1, in the inserted (retracted) position the outer dimensions do not project past the first lock housing part 14 inserted into the door penetration 11.

Figure 4:
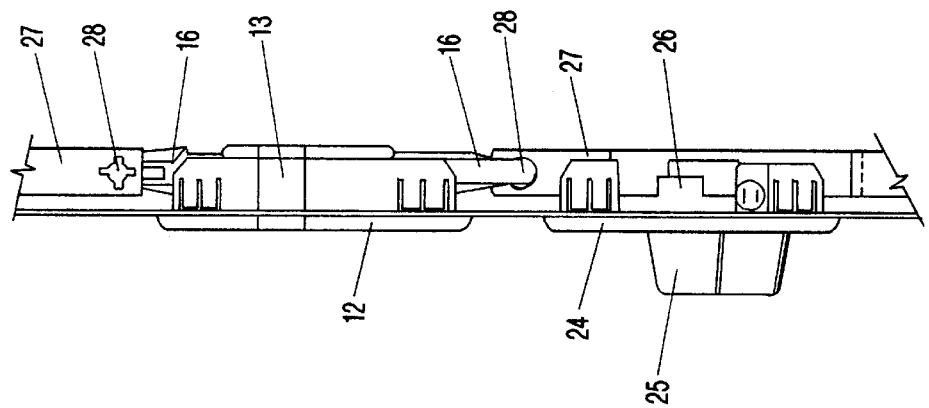
FIG. 4 the object of FIG. 3 in a sectional side view.
Figure 3:
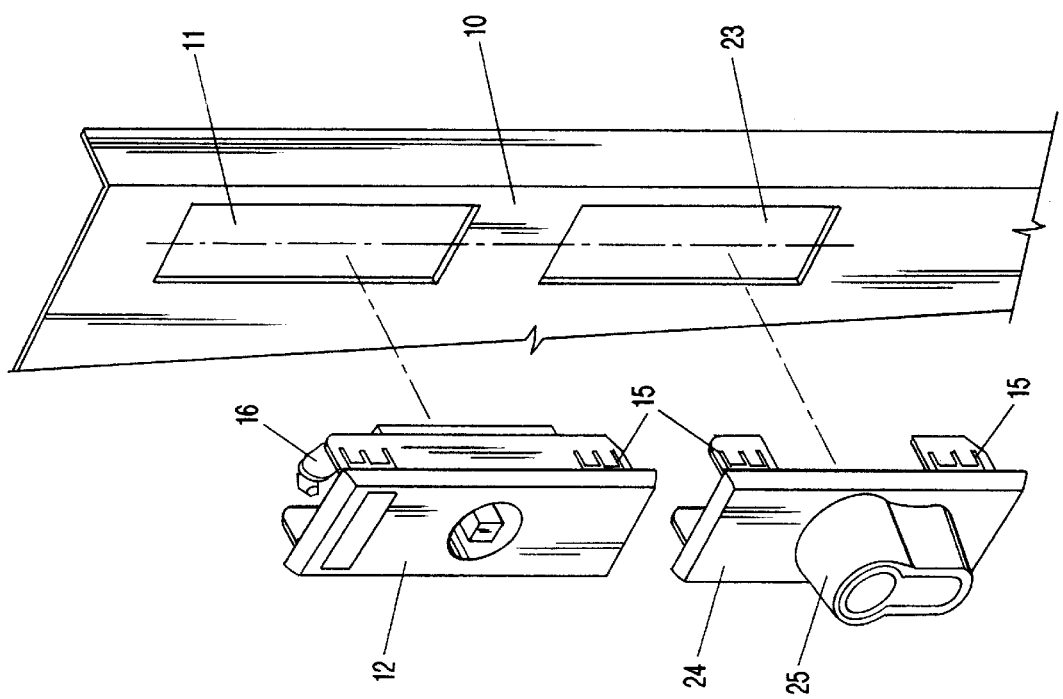
FIG. 3 a rod locking device for mounting in two door penetrations with an additional, lockable locking device for the locking rods.

In FIGS. 3 and 4 a further embodiment of the invention is disclosed showing a rod locking device for mounting in two door penetrations. For this purpose, a second plate 24 with cylinder lock 25 arranged thereat is provided which can be snapped into the second door penetration 23, whereby the lock lever of the lock cylinder 25, which is not represented in detail, engages a cutout 26 provided at a corresponding locking rod 27 so that in the locking position of the cylinder lock 25 a longitudinal movement of the locking rod 27 is prevented, while in the open position of the cylinder lock 25 the locking rod 27 is released so that upon rotation of the actuating device 20 the rod locking device can be moved between its open position and its locking position.

The specification incorporates by reference the entire disclosure of German priority document 296 06 992.2 of Apr. 19, 1996, as well as of International Application PCT/DE97/00727 of Apr. 8, 1997.

The present invention is, of course, in no way restricted to the specific disclosure of the specification and drawings, but also encompasses any modifications within the scope of the appended claims.

What is claimed is:

1. A rod locking device for locking cabinet doors, said rod locking device comprising:

locking rods (27) movable between an unlocked position for opening the cabinet doors and a locking position for locking the cabinet doors;

a two-part lock housing (13, 14, 17) having short rods (16) arranged therein;

said short rods (16) connected by a connecting device (28) to said locking rods (27);

said lock housing (13) having a drive member (21) arranged therein and connected to said short rods (16);

an actuating device (20) connected to said drive member (21) and actuating said drive member (21) for moving said short rods (16);

said short rods (16) having a length such that, in a retracted position of said short rods (16), said short rods (16) do not project from said lock housing (13);

said lock housing (13) having a base plate (12) to be positioned at an exterior side of the cabinet door (10) at a door penetration (11);

said lock housing (13) having a first lock housing part (14) and a second lock housing part (17), wherein said second lock housing part (17) is congruent to said first lock housing part (14) in a view perpendicular to said base plate (12) such that said lock housing is insertable into said door penetration (11) from the exterior side of the cabinet door;

wherein said first lock housing part (14) is a unitary part of said base plate (12) in the form of a projection;

wherein said lock housing (13), when preassembled from said first and second lock housing parts (14, 17) and with said short rods (16) arranged therein in said retracted position, is insertable through said door penetration (11) from said exterior side; and wherein said first lock housing part (14) has laterally arranged spring tongues (15) and wherein said base plate (12) is snapped into place at said door penetration (11) by said spring tongues (15).

2. A rod locking device according to claim 1, wherein said sprang tongues (15) are respectively arranged at longitudinal sides of said first lock housing part (14) in the vicinity of four corner points of said lock housing (13).

3. A rod locking device according to claim 1, wherein a plurality of said spring tongues (15) are provided, wherein said spring tongues (15) have snap-fit edges facing said base plate (12) and wherein said snap-fit edges have different spacing relative to said base plate (12), so that said spring tongues (15) allow securing of said lock housing (13) at said door penetrations (11) of cabinet doors (10) having different material thickness.

4. A rod locking device according to claim 1, wherein said second lock housing part (17) is secured at said first lock housing part (14) by a central screw (22) engaging a shaft of said actuating device (20).

5. A rod locking device according to claim 1, wherein said second lock housing part (17) is connected to said first lock housing part (14) by snap-fitting form-locking members (18, 19).

6. A rod locking device according to claim 1, wherein the cabinet door (10) has two rectangular ones of said door penetrations (11, 23) that are aligned with one another for accommodating said locking rods, wherein in a first one of said door penetrations (11) said base plate (12) and said lock housing (13) with said short rods (16) is secured by snap-fitting, said rod locking device further comprising a plate (24) having a cylinder lock (25) and auxiliary spring tongues (15), wherein said plate (24) is inserted into said second door penetration (23) and snapped into position by said auxiliary spring tongues (15), wherein said cylinder lock has a lock lever that, in a locking position of said lock cylinder (25), engages a cutout (26) of said locking rod (27) extending along said second door penetration (23) and, in an unlocked position of said cylinder lock (25), releases said cutout (26).

7. A rod locking device according to claim 6, further comprising a blind plate (24) having securing spring tongues (15), said blind plate (24) inserted and snap-fit into said second door penetration (23) for covering said door penetration (23).

* * * * *